US007234084B2

(12) United States Patent
Franchuk et al.

(10) Patent No.: US 7,234,084 B2
(45) Date of Patent: Jun. 19, 2007

(54) SYSTEM AND METHOD FOR ASSOCIATING A DLPDU RECEIVED BY AN INTERFACE CHIP WITH A DATA MEASUREMENT MADE BY AN EXTERNAL CIRCUIT

(75) Inventors: Brian A. Franchuk, Richfield, MN (US); Roger R. Benson, Eden Prairie, MN (US)

(73) Assignee: Emerson Process Management, Eden Prairie, MN (US)

( * ) Notice: Subject to any disclaimer, the term of this patent is extended or adjusted under 35 U.S.C. 154(b) by 723 days.

(21) Appl. No.: 10/781,372

(22) Filed: Feb. 18, 2004

(65) Prior Publication Data

US 2005/0182501 A1 Aug. 18, 2005

(51) Int. Cl.
*G06F 11/00* (2006.01)
(52) U.S. Cl. .......................... 714/47; 700/79; 700/108
(58) Field of Classification Search .................. 714/43, 714/47; 700/79, 108
See application file for complete search history.

(56) References Cited

U.S. PATENT DOCUMENTS

| | | | |
|---|---|---|---|
| 4,939,753 A | | 7/1990 | Olson |
| 5,293,374 A | | 3/1994 | Eidson |
| 6,014,612 A | * | 1/2000 | Larson et al. ............... 702/183 |
| 6,119,047 A | | 9/2000 | Eryurek et al. |
| 6,298,454 B1 | * | 10/2001 | Schleiss et al. ............... 714/37 |
| 6,377,859 B1 | | 4/2002 | Brown et al. |
| 6,424,872 B1 | * | 7/2002 | Glanzer et al. ............... 700/18 |
| 6,434,504 B1 | | 8/2002 | Eryurek et al. |
| 6,445,963 B1 | | 9/2002 | Blevins et al. |
| 6,449,574 B1 | | 9/2002 | Eryurek et al. |
| 6,473,660 B1 | | 10/2002 | Thibault |
| 6,485,688 B1 | | 11/2002 | Sivavec et al. |
| 6,505,519 B2 | | 1/2003 | Henry et al. |
| 6,519,546 B1 | | 2/2003 | Eryurek et al. |
| 6,522,934 B1 | | 2/2003 | Irwin et al. |
| 6,532,392 B1 | | 3/2003 | Eryurek et al. |
| 6,535,926 B1 | | 3/2003 | Esker |
| 6,564,268 B1 | * | 5/2003 | Davis et al. ................... 710/11 |
| 2001/0023464 A1 | | 9/2001 | Deck et al. |
| 2002/0010562 A1 | | 1/2002 | Schleiss et al. |
| 2002/0022894 A1 | | 2/2002 | Eryurek et al. |
| 2002/0029130 A1 | | 3/2002 | Eryurek et al. |
| 2002/0037017 A1 | | 3/2002 | Kiesel et al. |
| 2002/0038156 A1 | | 3/2002 | Eryurek et al. |
| 2002/0061083 A1 | | 5/2002 | Kaesdorf et al. |
| 2002/0112044 A1 | | 8/2002 | Hessmer et al. |
| 2002/0126782 A1 | | 9/2002 | Rotsch et al. |
| 2002/0147511 A1 | | 10/2002 | Eryurek et al. |
| 2002/0167904 A1 | | 11/2002 | Borgeson et al. |
| 2002/0169582 A1 | | 11/2002 | Eryurek et al. |
| 2002/0183971 A1 | | 12/2002 | Wegerich et al. |

(Continued)

*Primary Examiner*—Robert Beausoliel
*Assistant Examiner*—Philip Guyton
(74) *Attorney, Agent, or Firm*—Kinney & Lange, P.A.

(57) ABSTRACT

A diagnostic tool has a packet based network medium attachment unit, a measurement interface, a network interface, and a microprocessor for reading DLPDUs from a network segment and for taking simultaneous measurements of DLPDUs on the segment. The measurement data is associated with a stored DLPDU if the DLPDU is still active on the network segment when the measurement data is read by the microprocessor. The diagnostic tool utilizes a currently active attribute to determine the status of a DLPDU.

14 Claims, 7 Drawing Sheets

U.S. PATENT DOCUMENTS

2002/0194547 A1 12/2002 Christensen et al.
2003/0040881 A1 2/2003 Steger et al.
2003/0046380 A1 3/2003 Steger et al.
2003/0056043 A1 3/2003 Kostadinov

* cited by examiner

SYSTEM AND METHOD FOR ASSOCIATING A DLPDU RECEIVED BY AN INTERFACE CHIP WITH A DATA MEASUREMENT MADE BY AN EXTERNAL CIRCUIT

BACKGROUND OF THE INVENTION

The present invention generally relates to a diagnostic device for use with process control systems. More specifically, the present invention relates to hand-held diagnostic devices for interfacing with a packet based network (such as Fieldbus) in a process control system and for interacting with the communications of the field devices linked to the network in order to associate communication packets with specific field devices for the purpose of diagnosing problems on the network.

In industrial settings, control systems monitor and control inventories, industrial and chemical processes, and the like. Typically, the control systems perform these functions using field devices distributed at key locations in the industrial process and coupled to the control circuitry in the control room by a process control loop. The term "field device" refers to any device that performs a function in a distributed control system, including all devices currently known in the control art.

Generally, each field device includes a transducer or actuator. A transducer (including actuators) is understood to mean either a device that generates an output signal based on a physical input or that generates a physical output based on an input signal. Typically, a transducer transforms an input into an output having a different form. Often, one system provides power to actuate a transducer, which in turn supplies power usually in another form to a second system. For example, a loudspeaker is a transducer that transforms electrical signals into sound energy. Types of transducers typically include various analytical equipment and sensors, pressure sensors, thermistors, thermocouples, strain gauges, flow transmitters, positioners, actuators, solenoids, indicator lights, and the like.

A communication network links the controllers with the sensors and actuators located in the field. One such communications network is a packet based network such as Fieldbus. Fieldbus is a generic term used to describe a digital, bidirectional, multidrop, serial communication network for connecting isolated field devices, such as controllers, actuators and sensors, in industrial applications. The Instrument Society of America (ISA) adopted a standard for Fieldbus communications, which is identified as ISA SP50.02. The ISA standard Fieldbus system utilizes a two wire bus to provide simultaneous digital communication and DC power to remotely located field devices.

In general, the Fieldbus communication protocol is a known open communication protocol that is employed in many process control networks. Generally, Fieldbus provides synchronous (i.e., scheduled) communications and asynchronous (e.g. token ring) communications on a network bus. The scheduled/synchronous communications are used for signals relating to actual process control activities, while the asynchronous communications are used to convey secondary information (such as communications to and from a user or for measurements not directly related to process control).

Field devices derive power from the two-wire bus, and transmit data to and receive messages from a central controller, which is separated physically from the field devices. When problems arise in communicating with a particular field device or if data received from the field device is anomalous, it is sometimes necessary to diagnose the problem manually.

Some attempts have been made to incorporate diagnostic circuit elements within individual field devices to allow the field devices to diagnose themselves. However, such additional circuitry increases the cost of the individual field device. Additionally, when transmission errors arise, such internal circuitry may be insufficient to properly identify the problem, sending messages indicating the field device is okay when in fact there is a problem. Moreover, such extra circuitry places a power drain on the Fieldbus power supply that most of the time is unnecessary, resulting in wasteful power dissipation.

It is also possible to connect a device, such as a Fieldbus Monitor FBT-3 produced by RELCOM, Inc. of Forest Grove, Oreg., to examine a "live" Fieldbus network without interfering with its operation. Such a device is intended to verify and to troubleshoot network operation, but, by itself, it cannot communicate on the Fieldbus segment.

As previously mentioned, Fieldbus is a type of serial communication network for connecting isolated field devices, such as controllers, actuators and sensors or transmitters, in industrial applications. Typically, the network involves homerun cabling connecting a control center with various field devices, either directly or via junction boxes, which connect one or more serial devices to the network. Generally, a fieldbus capable field device includes a fieldbus interface chip and a sensor, transducer, actuator or other similar circuit element for functioning on the network.

Since the precise requirements of each field device vary, it is not always possible to provide a direct interface from the Fieldbus Interface Chip to the measurement circuit of the field device. Moreover, on a "live" Fieldbus network, multiple data-link-protocol-data-units (DLPDUs) may be traversing the communication path in quick succession. This requires that the diagnostic circuit be capable of correctly associating a DLPDU with its source.

With current diagnostic devices and methods, troubleshooting communication problems and configuration errors associated with the field devices on the protocol bus is difficult. As a result, users at the system level cannot easily identify the source of problems and are typically only informed by the system that the overall process is not operating properly. When such an alert arises, it is difficult to identify and fix the errant field device.

BRIEF SUMMARY OF THE INVENTION

A diagnostic system associates data link protocol data units (DLPDUs) with data taken by a measurement circuit using a measurement interface. The measurement interface communicates with the measurement circuit and a microprocessor to measure DLPDU data on the Fieldbus segment. The DLPDUs are written to the receive message queue according to the message queue manager. The DLPDU data is read from the queue in the order in which the DLPDUs occurred on the Fieldbus segment. The diagnostic tool takes a measurement of a DLPDU on the Fieldbus segment to extract measurement data. The tool writes the measurement data to a software queue. The software tests a status indicator associated with the measurement data to determine if the DLPDU is currently active. If the DLPDU from which the measurement data is taken is still active, the measurement data is associated with the DLPDU.

DETAILED DESCRIPTION

Figure 1:
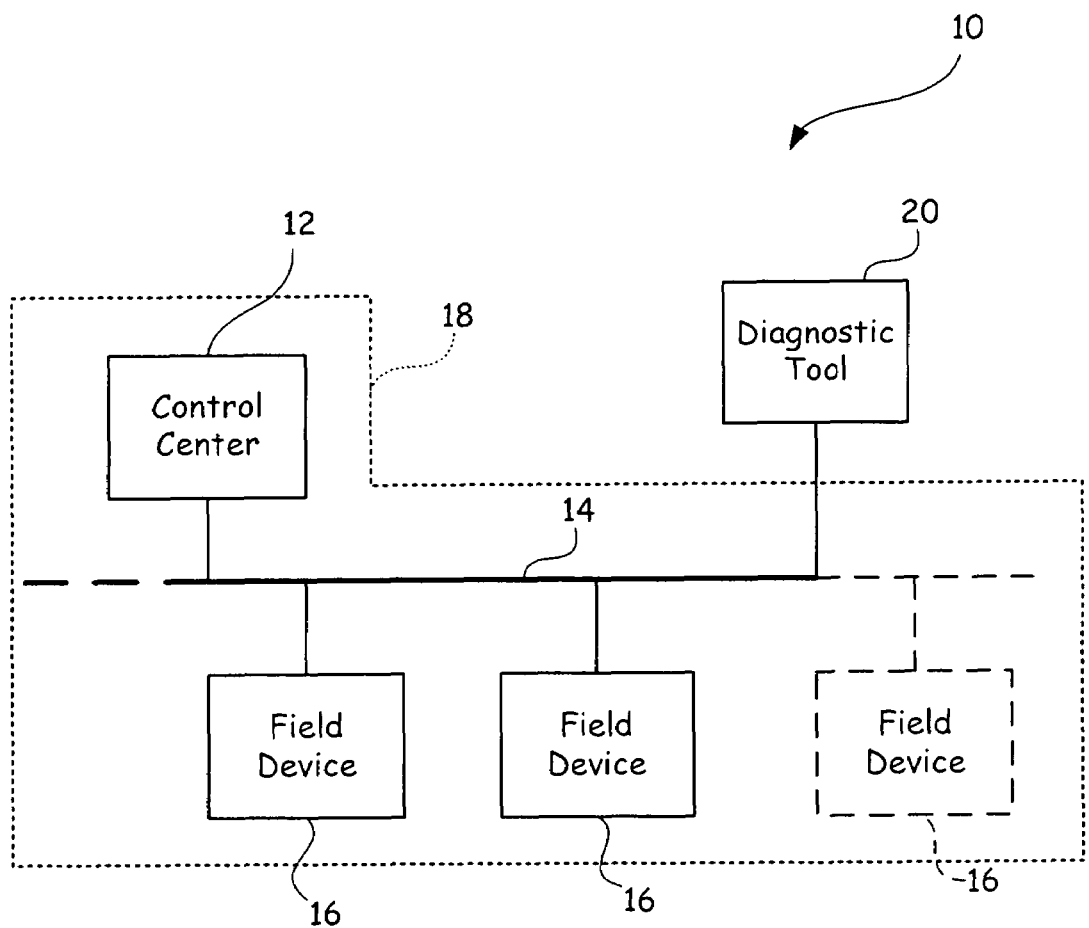
FIG. 1 is a schematic block diagram of a process control network with a diagnostic device according to the present invention.

FIG. 1 shows a industrial control system 10 having a control center 12 connected via a homerun cable 14 to a plurality of field devices 16 to form a control network 18. A diagnostic tool 20 is connected to the network 18. The homerun cable 14 extends in phantom and an additional field device 16 is also shown in phantom to illustrate that the homerun cabling 14 may be extended and field devices 16 may be added to extend the control network 18 as needed.

Generally, the homerun cable 14 may be a two-wire, a three-wire or a four-wire twisted pair cabling such as with a traditional Fieldbus network. In typical plants, the homerun cable 14 may extend thousands of meters and numerous field devices 16 may be connected (via connectors, direct wiring or a junction box) to the control center 12 via the cabling 14, making the network 18 quite large.

As shown, a diagnostic tool 20 is connected to the homerun cabling 14 in order to identify problems with the control network 18. Generally, the diagnostic tool 20 is a hand-held device that can be carried by an operator and installed at any point in the network 18. The diagnostic tool 20 has openings or leads designed to facilitate connection of the diagnostic tool 20 to the network 18 at a physical layer. The diagnostic tool 18 may be powered by the network 18 or alternatively by an independent power source, such as a battery, a solar panel, or existing power circuitry within the plant (e.g. a standard AC power circuit with two or three prong wall outlets).

In a Fieldbus network 18, field devices 16 transmit data in framed packets referred to as "Data Link Protocol Data Units" (DLPDUs). Generally, the data link protocol provides data link services by making use of the services available from the physical layer (the cabling). Each DLPDU contains a number of fields or delimiters: a frame control field which specifies the type of DLPDU and conveys size parameters of the DLPDU; zero to three explicit address fields, each containing a DL-address, all of the same length; additional parameters of the DLPDU; a user data field for most DLPDUs; and an Frame Check Sequence (FCS) field used to check the integrity of the received DLPDU. Appended to each DLPDU is a preamble and Start of Data (SD) delimiter. The DLPDU is terminated by an End of Data (ED) delimiters, indicating the end of the data string. Each individual bit of data may be considered as a physical-layer-protocol-data-unit (PLPDU), whereas a series of bits are combined to make up the DLPDU.

Generally, one or more DLPDUs are transmitted on the Fieldbus cabling 14. The diagnostic tool 20 observes or detects each DLPDU independently. If the diagnostic tool 20 had a Fieldbus Interface Chip (FIC) that is capable of receiving and processing only one DLPDU at a time (such as with conventional diagnostic tools), the measurement data associated to the DLPDU could be validated simply by checking the status of the Receive Activity Signal (RxA). If the signal is active after the software has taken a data measurement, then the measurement is associated correctly with the received DLPDU.

In contrast, the diagnostic tool 20 of the present invention has a FIC that is capable of queuing multiple DLPDUs. Since the FIC is capable of queuing multiple received DLPDUs to allow for software latency, the RxA signal can no longer be used as a mechanism to validate the measurement data to DLPDU association. Due to queuing, the DLPDU at the front of the queue may not necessarily be the DLPDU currently active on the Fieldbus segment.

Figure 2:
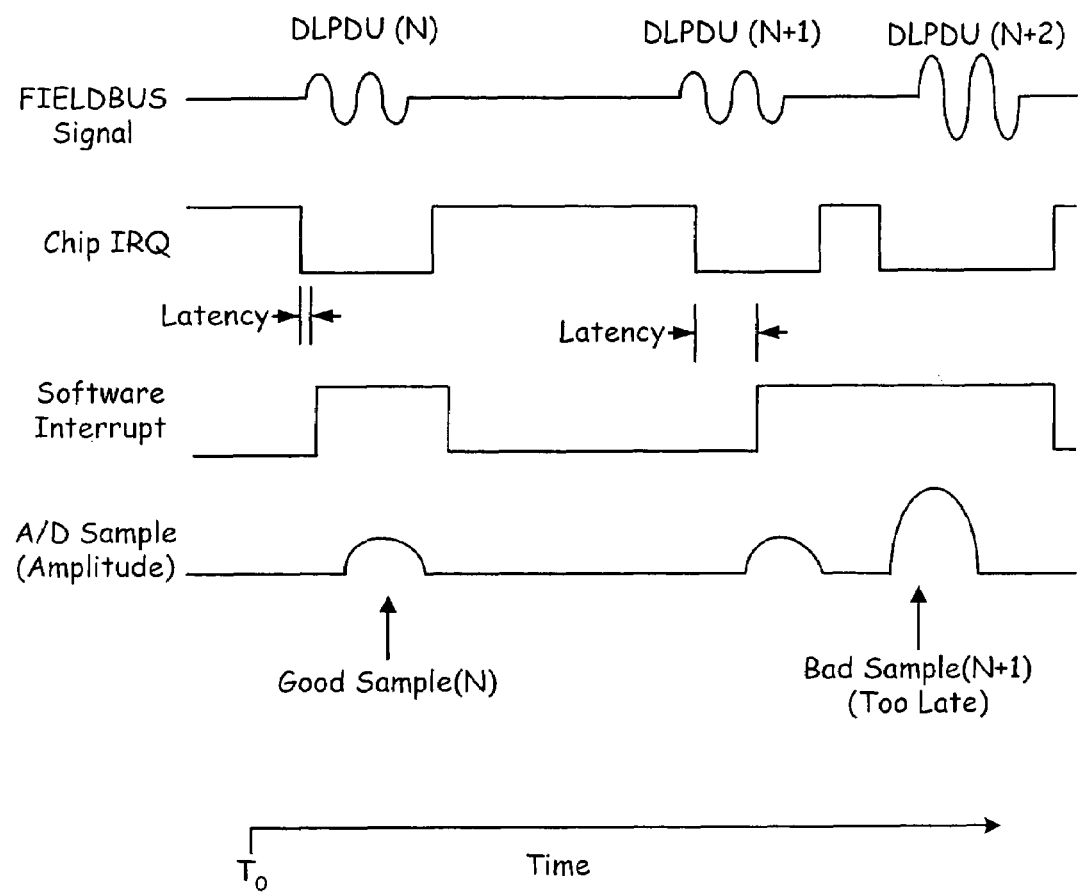
FIG. 2 is an example of a timing diagram illustrating latencies between software wake ups leading to a bad sample, thereby necessitating the present invention.

FIG. 2 illustrates a timing diagram for a diagnostic tool 20 connected to a Fieldbus network 18 to illustrate this point. As shown, a series of DLPDUs are transmitted over the Fieldbus network. The first DLPDU in time is illustrated as a sinusoidal waveform labeled as DLPDU(N) and the subsequent DLPDU is labeled as DLPDU(N+1).

In order to read a DLPDU message packet, the packet must be sampled. Typically, an external circuit generates a chip interrupt request (Chip IRQ). The chip interrupt request in turn triggers a Software Interrupt. Typically, it takes a small amount of time to wake up the software once the leading edge of the chip interrupt request signal is received. The delay between the receipt of the leading edge of the Chip IRQ and the wake up time for the Software Interrupt is a latency period.

As shown, an external circuit generates a Chip IRQ when DLPDU (N) is active on the Fieldbus network. The Chip IRQ causes a Software Interrupt which in turn causes the chip to sample the signal on the Fieldbus line. When the chip finishes sampling, if the same DLPDU is within the window, then the resulting sample is good. However, given the latency delays between the chip interrupt request and the wake up of the software on the chip, and given that the length and spacing of DLPDUs on the network can vary dramatically, it is possible that at the time when the analog to digital sample is occurring, the DLPDU disappears from the window. As shown with respect to DLPDU (N+1), the analog to digital sample begins after the DLPDU has ended. It is possible if a second DLPDU (N+2) is transmitted immediately after the DLPDU (N+1), the analog to digital sample may catch the tail end of DLPDU (N+1) or the leading edge of DLPDU (N+2). Alternatively, the sample simply detects the carrier signal at its trailing end. Whether the DLPDU has disappeared from the window or is replaced with a subsequent DLPDU, the reading is out of range, and it is not possible to associate the signal reading to the DLPDU.

The diagnostic tool 20 utilizes a boolean attribute or status indicator, "CurrentlyActive", to each DLPDU object received by the FIC. Since the FIC is capable of queuing multiple DLPDU objects, there exists a set of P (P>1) DLPDU objects in the FIC hardware memory. When the DLPDU object is selected by the input multiplexer, the CurrentlyActive attribute is set to true after receipt of a start of activity delimiter (i.e. when the Receive Activity "RxA"

signal is true). The CurrentlyActive attribute is reset to false after receipt of an end of activity delimiter (i.e. when the Receive Activity "RxA" signal is false).

Figure 3:
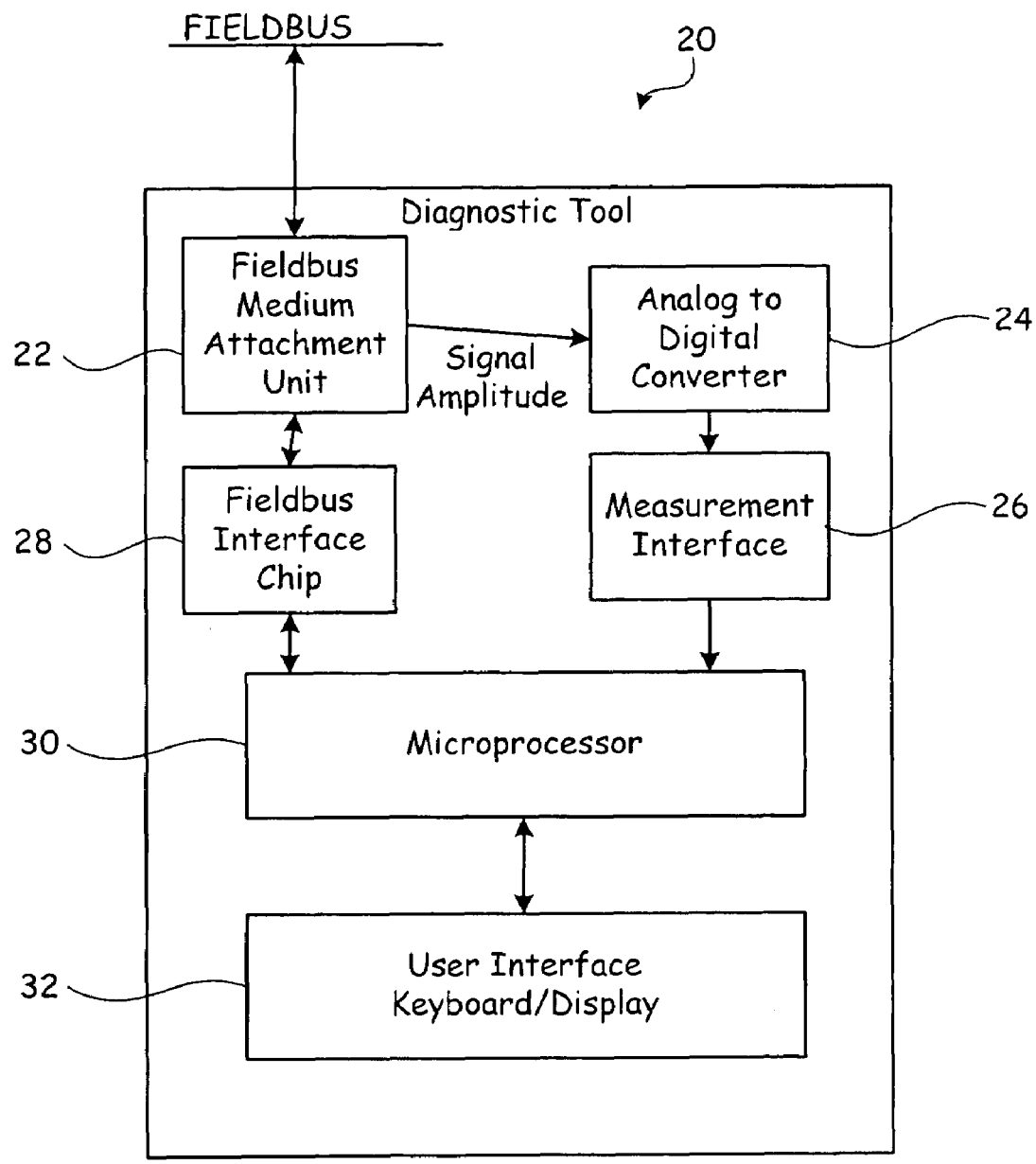
FIG. 3 is a block diagram of the diagnostic tool according to the present invention.

As shown in FIG. 3, generally the diagnostic tool 20 of the present invention has a Fieldbus medium attachment unit (MAU) 22, an analog to digital (A/D) converter 24, a measurement interface, a Fieldbus interface chip (FIC) 28, a microprocessor 30, and a user interface 32 (keyboard and display, or similar interface). In essence, the MAU 22 takes measurements of the signals on the Fieldbus segment. The signal amplitude is passed to the A/D converter 24, which passes the digital information to the measurement interface 26. The measured DLPDU is also passed to the FIC 28. The measurement interface 26 and the FIC 28 pass their respective data to the microprocessor 30, which utilizes the DLPDU and digital measurement data to provide display information to the user interface 32.

In essence, the MAU 22 both measures the signal on the network and retrieves the DLPDU, passing the signal to the A/D converter 24 and passing the DLPDU to the FIC 28 for further processing. As will be discussed in detail with respect to later figures, circuitry in the FIC 28 generates a software interrupt request when a DLPDU is active on the Fieldbus segment. The RxA signal activates a state machine in the FIC 28 which receives the DLPDU from the MAU 22. The DLPDU then is shifted into a free block of registers within a queue according to a receive queue manager 50 (FIG. 6), which manages the receive message queue and which controls the register into which the DLPDUs are shifted. The data stored and registered can be identified as to whether it is the active DLPDU on the Fieldbus segment.

In a preferred embodiment, the queue includes three receive message registers and a single transmit register; however, it is conceivable that more than three registers could be used. In the present instance, if the number of stored DLPDUs reaches three, and the diagnostic tool 20 does not begin processing one of the stored DLPDUs, then there is a problem with the diagnostic tool 20. While diagnosis of the diagnostic tool 20 itself is not a function of the DLPDU or of the tool 20, it is characteristic of the diagnostic tool 20 that the diagnostic tool 20 typically does not fall more than one or two messages behind at any given time.

Figure 4:
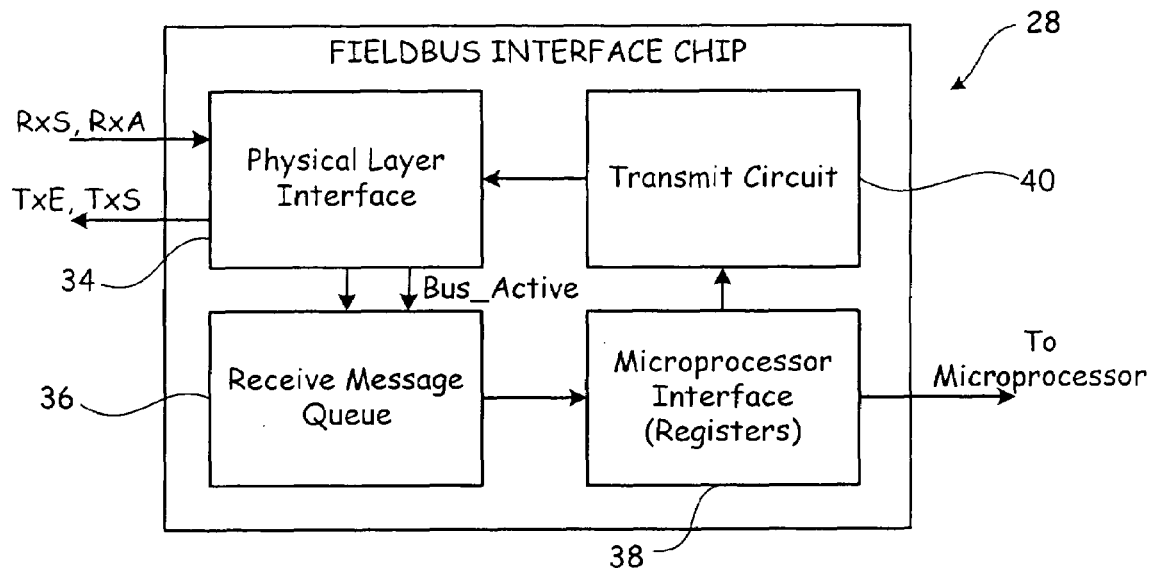
FIG. 4 is an expanded block diagram of the Fieldbus Interface Chip inside the diagnostic tool of FIG. 3.

FIG. 4 illustrates an expanded view of the FIC 28, internal to the diagnostic tool 20. As shown, the RxS, RxA, TxE and TxS signals interact with the physical layer interface 34 of the FIC 28. The DLPDU data is then passed to the receive message queue 36 together with a bus_active flag. The bus_active flag remains true as long as a DLPDU is being received. At the end of the DLPDU, the bus_active flag is set to false. The DLPDUs are shifted from the receive message queue 36 to the microprocessor interface 38 in the order they are received. The read DLPDU is then passed to the microprocessor.

The microprocessor interface 38 also passes data to the transmit circuit 40, which in turn transmits the data via the physical layer interface 34 to the Fieldbus segment (not shown).

Figure 5:
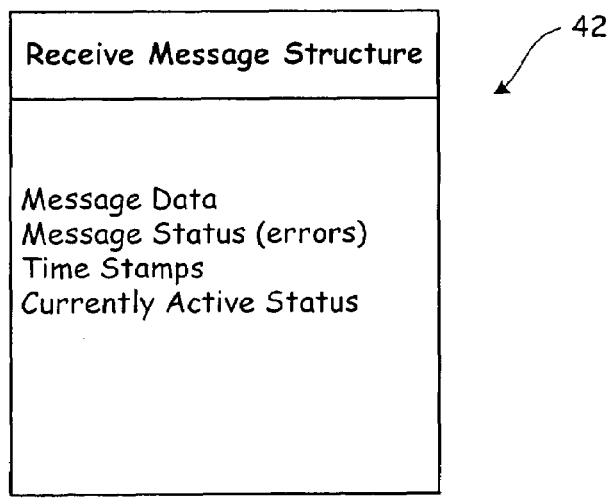
FIG. 5 is a block diagram of the message structure of a receive message stored in the receive message queue of FIG. 4.

FIG. 5 illustrates the structure of a received message 42. As shown, the received message 42 contains message data, message status information (e.g. error data), time stamps, and a currently active status indicator. Using the currently active status indicator, a measurement taken from the fieldbus segment can be associated to a particular DLPDU.

Figure 6:
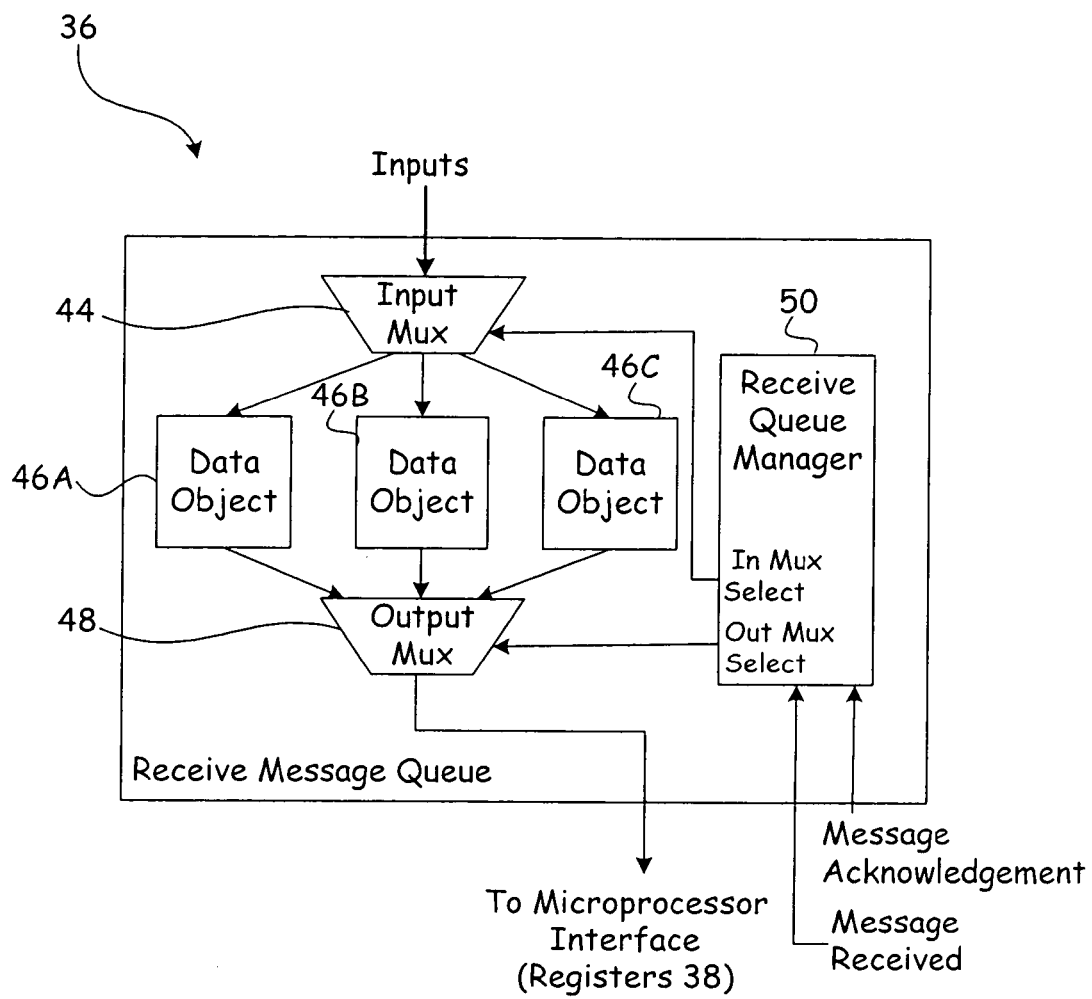
FIG. 6 is a expanded block diagram of the receive message queue of FIG. 4.

FIG. 6 illustrates the receive message queue 36. As shown, messages are input to input multiplexer (MUX) 44. Depending on the input selected by Receive Queue Manager 50, the input MUX 44 shifts the messages (in the order they are received) into one of the receive message queue, indicated by data objects 46A, 46B, and 46C. Output MUX 48 reads data from a selected data object 46A, 46B, or 46C according to the output selected by the Receive Queue Manager 50. The output MUX 48 then passes the information to the Microprocessor Interface 38. A message acknowledgment is sent by the microprocessor 30 to the Receive Queue Manager 50 indicating that data has been read out of one of the data objects 46A, 46B or 46C, thereby incrementing pointers of the Receive Queue Manager 50, so that the next input event and the next output event read from the next data object in order.

A first message received by the diagnostic tool 20, for example, would be passed to the input MUX 44. The Receive Queue Manager 50 would have both the data in and data out pointers pointing to data object 46A. The message would be written into data object 46A. The Receive Queue Manager 50 would then update its input pointer to point to data object 46B, so that the next received message would not overwrite the data stored in 46A. When the microprocessor 30 is ready to read data from the output, data stored in data object 46A is gated through the output MUX 48 and on to the microprocessor interface 38. When the data is read from the output mux 48, a message acknowledgment is sent to the Receive Queue Manager 50, causing the Receive Queue Manager 50 to update its output pointer (Out on FIG. 6) to point to the next data object 46B, and so on. When data object 46C is full, the pointer advances to point to 46A, like a ring buffer.

Figure 7:
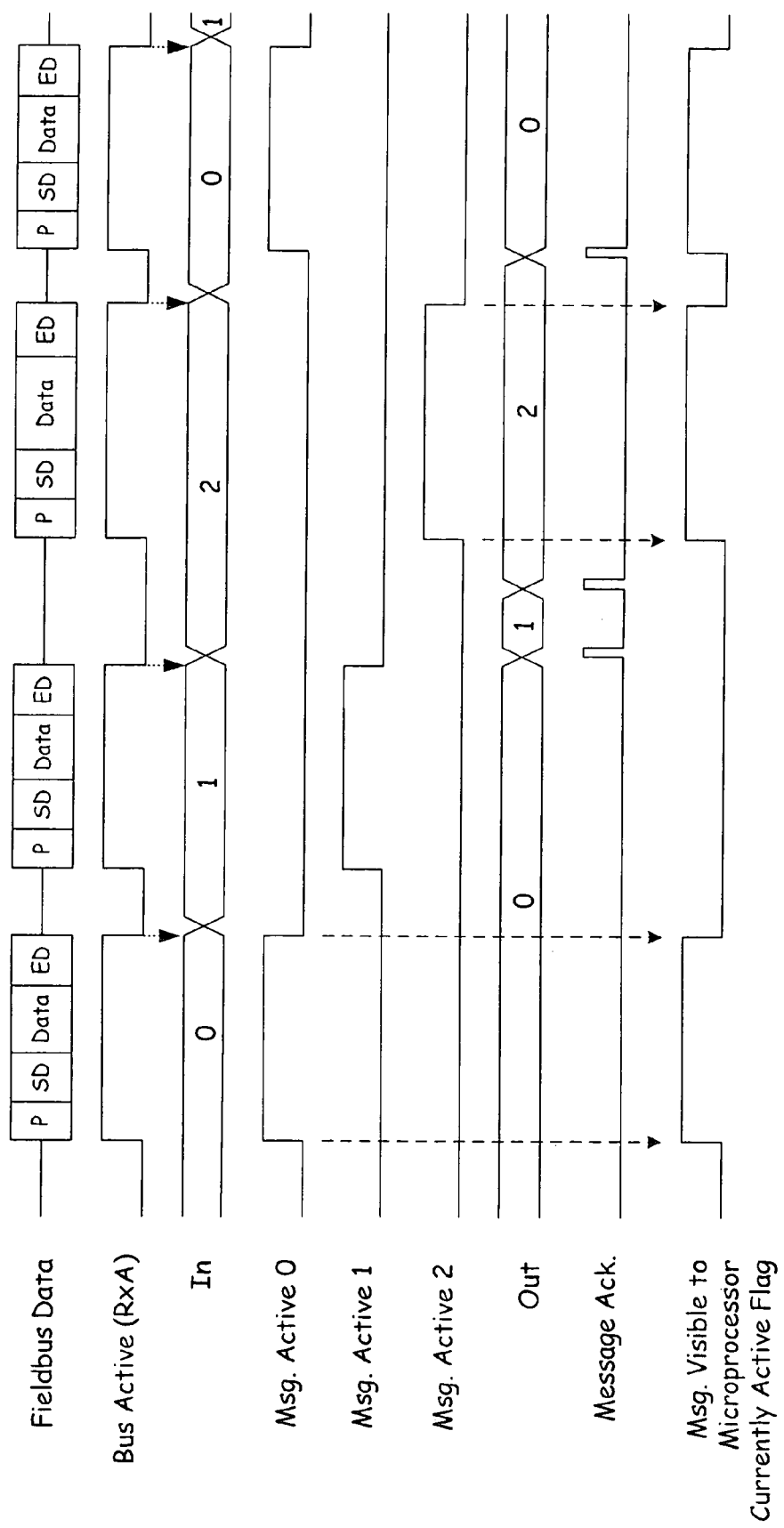
FIG. 7 is a timing diagram illustrating the queuing of the diagnostic tool of the present invention.

FIG. 7 illustrates a timing diagram. As shown, a series of DLPDUs are received from the Fieldbus segment. The Bus Active (RxA) corresponds to each received DLPDU. The "In" select shown in FIG. 6 begins in a zero state, effectively selecting data object 46A (shown in FIG. 6). While the first DLPDU is being read, the Message Active 0 line indicates that the DLPDU being read into data object 46A is currently active. Once the DLPDU leaves the Fieldbus segment, the Message Active 0 line goes to a low state, indicating that the DLPDU is no longer active. The "In" select changes from zero state to a one (1), indicating that the next received DLPDU will be stored in message 1 (data object 46B in FIG. 6), and so on. As shown, message 1 is indicated to be visible to the microprocessor 30, thus the first DLPDU was associated with the measurement data. However, the second received DLPDU came and left the segment before the Message Acknowledgment was sent. Thus, the DLPDU could not be associated with the measurement data. However, the third message was able to be associated with the measurement data, because the third DLPDU was visible to the microprocessor 30 while the message was active on the Fieldbus segment. Thus, the diagnostic tool 20 utilizes the currently active status indicator to determine whether it can associate measurement data with the received DLPDU.

Figure 8:
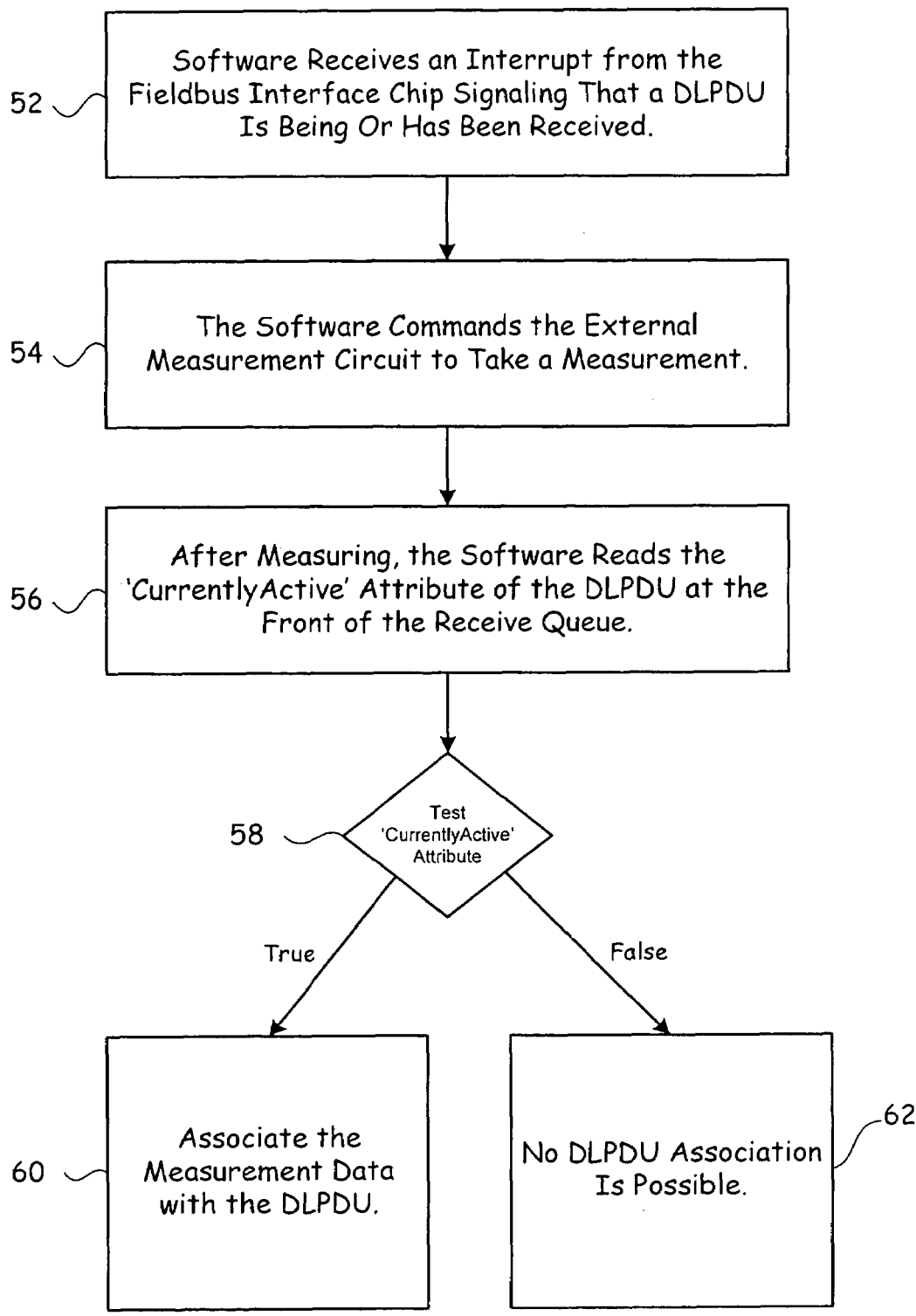
FIG. 8 is a flow diagram of a method associating measurement data with a Data Link Protocol Data Unit (DLPDU) according to the present invention.

As shown in FIG. 8, the software receives an Interrupt from the Fieldbus interface chip signaling that a DLPDU is being or has been received. Step 52). The software directs the external circuit to take a measurement (Step 54). After the measurement is taken, the software reads the "CurrentlyActive" attribute of the DLPDU at the front of the receive queue (Step 56). The "CurrentlyActive" attribute is tested (Step 58). If the Currently Active attribute is true, then the DLPDU at the front of the receive queue is actually the DLPDU being measured, and the measurement data is associated with the DLPDU (Step 60). If the Currently Active attribute is false, then no DLPDU association is possible (Step 62).

In general, the Fieldbus chip is capable of queuing multiple received DLPDUs to allow for software latency. The receive active signal is not used as a mechanism to validate the measurement data to DLPDU association. Due to queuing, the DLPDU at the front of the queue may not necessarily be the DLPDU currently active on the Fieldbus segment. Thus, the present invention uses a boolean attribute (Currently Active) relative to each object in the Fieldbus chip hardware which represents a DLPDU that could be received by the Fieldbus chip.

The association of the DLPDU message content with a specific field device is independent of both the CPU and the measurement circuit. The software driver only needs to check to make sure that the Currently Active attribute is true after taking the measurement value to guarantee the measurement's validity. The association decision is guaranteed to be correct. If the Currently Active attribute is true, then that DLPDU is positively associated with the measurement value. If false, there is no possible association. If conventional receive active flags (RxA) were used to associate measurement values to DLPDUs, the measurements made when a receive is active cannot be guaranteed to be associated with the DLPDU in the receive queue even though there is a high likelihood that it is the case, especially with faster CPUs.

By implementing the Currently Active attribute in hardware, the DLPDU verification process requires very few additional gates, adding virtually no cost to the hardware. While this association scheme does not guarantee that every DLPDU can be associated with a measurement value, at the very least, the present invention guarantees that when an association between measurement data and the DLPDU is made, the association is valid. In the worst case, no DLPDU can be associated with the measurement value. The measurements must always be made while the DLPDU is actually active on the Fieldbus network, which imposes a significantly tighter latency restriction on software than on the receive queue, which can hold multiple DLPDUs. Nevertheless, while previous diagnostic tools could read multiple DLPDUs but not associate the DLPDU with the specific field device, or could only do one at a time, the present invention allows for associating specific DLPDUs with a specific field device. This is a significant improvement over the prior art.

While the present invention has been described with respect to DLPDUs transmitted over a Fieldbus network, it will be understood by workers skilled in the art that the technique of the present invention may be applied to process control signals transmitted over any type of process control network. In particular, the present invention may be applied for diagnostic tools for use with a currently active process control network over which multiple process control signals are transmitted and received.

Although the present invention has been described with reference to preferred embodiments, workers skilled in the art will recognize that changes may be made in form and detail without departing from the spirit and scope of the invention. For example, although one specific type of packet based network (i.e. Fieldbus) has been used in this description, the invention is applicable to other forms of packet based networks (e.g. Multidrop RS232) as well.

The invention claimed is:

1. A method for diagnosing a segment of a process control network comprising:
   receiving a DLPDU on the process control network;
   taking a measurement of the DLPDU network to extract measurement data;
   testing a status indicator to determine if the DLPDU is currently active; and
   associating the measurement data with the DLPDU if the status indicator is true.

2. The method of claim 1 and further comprising:
   setting the status indicator to true while the DLPDU is being received.

3. The method of claim 1 wherein the status indicator is a boolean attribute.

4. The method of claim 1 wherein the step of receiving comprises:
   selecting a free block of registers;
   writing DLPDU data to the free block of registers; and
   setting the status indicator to true.

5. The method of claim 4 and further comprising:
   setting the status indicator to false upon receipt of an end of activity field in the DLPDU from the process control network.

6. The method of claim 1 wherein the process control network is a Fieldbus network.

7. A method for associating measurement data with a DLPDU on a process control network comprising:
   measuring a received DLPDU object on a network segment to derive measurement data; and
   associating the received DLPDU object with the measurement data if a currently active attribute is true after the measurement data is taken.

8. The method of claim 7 further comprising:
   setting a currently active attribute to true after receiving a start of activity delimiter of the DLPDU object; and
   setting the currently active attribute to false after receiving an end of activity delimiter of the DLPDU object.

9. The method of claim 7 wherein the measuring is performed while the DLPDU object is active on the process control network.

10. The method of claim 7 wherein DLPDU data representing the received DLPDU object is read from a queue according to an order in which the DLPDU data was received.

11. A method of associating measurement data with a received process signal on a process control loop, the method comprising:
    receiving a process signal from the process control loop with a diagnostic tool connected to the process control loop;
    measuring the received process signal to derive measurement data;
    writing data representing the process signal to a memory queue along with a currently active attribute;
    processing with the diagnostic tool the data at a front of the memory queue such that the data stored first in the memory queue is processed first; and
    associating the measurement data with the data from the memory queue received if the currently active attribute associated with the data from the queue is true at the time of processing.

12. The method of claim 11 wherein the diagnostic tool is powered by the process control loop.

13. The method of claim 11 wherein the step of processing is performed in software.

14. The method of claim 11 wherein the step of processing is performed by a circuit.

* * * * *